United States Patent
Cillis et al.

(10) Patent No.: US 10,547,696 B2
(45) Date of Patent: *Jan. 28, 2020

(54) REPLACING A VIRTUAL NETWORK FUNCTION IN A NETWORK SERVICE

(71) Applicants: International Business Machines Corporation, Armonk, NY (US); ng4T GmbH, Berlin (DE)

(72) Inventors: Canio Cillis, Berlin (DE); Jochen Kappel, Berlin (DE); Martin McDonald, Berlin (DE); Christian van Maastricht, Amsterdam (NL)

(73) Assignees: International Business Machines Corporation, Armonk, NY (US); ng4T GmbH, Berlin (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/394,424

(22) Filed: Apr. 25, 2019

(65) Prior Publication Data

US 2019/0253500 A1 Aug. 15, 2019

Related U.S. Application Data

(63) Continuation of application No. 15/075,678, filed on Mar. 21, 2016, now Pat. No. 10,362,122.

(51) Int. Cl.
*H04L 29/08* (2006.01)
*H04L 12/24* (2006.01)
*H04L 29/12* (2006.01)

(52) U.S. Cl.
CPC ............ *H04L 67/16* (2013.01); *H04L 41/082* (2013.01); *H04L 41/0893* (2013.01);
(Continued)

(58) Field of Classification Search
CPC .............. H04L 41/082; H04L 41/5048; H04L 41/0806; H04L 41/0859; H04L 41/145;
(Continued)

(56) References Cited

U.S. PATENT DOCUMENTS

| 7,155,462 B1 | 12/2006 | Singh et al. |
| 9,716,626 B1 | 7/2017 | Herzog |

(Continued)

FOREIGN PATENT DOCUMENTS

| CN | 104410672 | 3/2015 |
| EP | 3182678 | 6/2017 |

(Continued)

OTHER PUBLICATIONS

Maini et al., Management and Orchestration of Virtualized Network Functions, A. Sperotto et al. (Eds.): AIMS 2014, LNCS 8508, pp. 52-56, 2014, copyright IFIP International Federation for Information Processing 2014.

(Continued)

*Primary Examiner* — Michael Won
*Assistant Examiner* — Muhammad Raza
(74) *Attorney, Agent, or Firm* — Schmeiser, Olsen & Watts, LLP; Isaac Gooshaw

(57) ABSTRACT

A method and associated computer system. A processor queries a service catalog and a virtual service inventory to obtain network service instances including a virtual network function. The processor seamlessly replaces the virtual network function by a new version of the virtual network function without interruption of the network service in the production environment. The processor deploys the new version of the virtual network function unattached to the production environment, including: replacing a network address of the virtual network function in the load balancer with a network address of the new version of the virtual network function. In response to a determination by the processor that the virtual network function has a floating network address, the processor detaches the floating network address from the virtual network function and attaches the detached floating network address to the new version of the virtual network function.

19 Claims, 6 Drawing Sheets

(52) U.S. Cl.
CPC ...... *H04L 41/5048* (2013.01); *H04L 41/5051* (2013.01); *H04L 41/5096* (2013.01); *H04L 67/101* (2013.01); *H04L 61/1511* (2013.01); *H04L 61/2007* (2013.01)

(58) Field of Classification Search
CPC ... H04L 47/125; H04L 41/0843; H04L 43/50; H04L 41/0896; H04L 41/20
See application file for complete search history.

(56) References Cited

U.S. PATENT DOCUMENTS

| | | | |
|---|---|---|---|
| 9,736,185 | B1* | 8/2017 | Belamaric ............... H04L 63/20 |
| 9,843,624 | B1 | 12/2017 | Taaghol et al. |
| 2008/0091837 | A1 | 4/2008 | Langen et al. |
| 2012/0278892 | A1 | 11/2012 | Turbin |
| 2015/0063166 | A1 | 3/2015 | Sif et al. |
| 2015/0156086 | A1* | 6/2015 | Chesla ..................... G06N 5/04 709/224 |
| 2015/0234725 | A1 | 8/2015 | Cillis et al. |
| 2016/0127169 | A1 | 5/2016 | de Sousa Teixeira et al. |
| 2016/0248860 | A1 | 8/2016 | Dunbar et al. |
| 2016/0269925 | A1* | 9/2016 | Chou ............... H04W 28/0226 |
| 2017/0078140 | A1* | 3/2017 | Gibson ............ H04L 41/0806 |
| 2017/0093616 | A1 | 3/2017 | Yan et al. |
| 2017/0150399 | A1 | 5/2017 | Kedalagudde et al. |
| 2017/0272523 | A1 | 9/2017 | Cillis et al. |
| 2017/0315839 | A1 | 11/2017 | Zhang |
| 2017/0353888 | A1* | 12/2017 | Weckstrom ........... H04W 28/08 |
| 2018/0011730 | A1* | 1/2018 | Zembutsu ................ G06F 9/46 |

FOREIGN PATENT DOCUMENTS

| | | |
|---|---|---|
| WO | WO 2014110453 | 7/2014 |
| WO | WO 2014125486 | 8/2014 |
| WO | WO 2015113278 | 8/2015 |
| WO | WO2015146355 | 10/2015 |

OTHER PUBLICATIONS

Mehmet Ersue, ETSI NFV Management and Orchestration—An Overview, #IETF #88, Vancouver, Canada, 14 Pages.
Tmforum, Extra Insights, NFV: Are You Prepared? Operations and Procurement Readiness, www.tmforum.org, Dec. 2014, 23 pages.
Don Clarke, Network Functions Virtualisation, ETSI NFV NOC chairman, Retrieved on Jan. 28, 2016, Retrieved from: http://www.etsi.org/technologies-clusters/technologies/nfv, 2 pages.
NFV & SDN Best Practices and Standards—TM Forum, Read our Quick Insights report on how NVV will impact OSS, Retrieved on Jan. 28, 2016, Retrieved from: https://www.tmforum.org/zoom/, 6 pages.
NFV & SDN Best Practices and Standards—TM Forum, Understanding SDN and how it will impact digital, Oct. 21, 2015, 9 pages.
DE920150178GB1 Search and Exam Report, dated Aug. 18, 2017, 10 pages.
ETSI GS NFV-MAN 001 V1.1.1 (Dec. 2014), Network Functions Virtualisation (NFV); Management and Orchestration, 184 pages, (three attachments).
Office Action (dated Feb. 7, 2018) for U.S. Appl. No. 15/075,678, filed Mar. 21, 2016.
Amendment (May 4, 2018) for U.S. Appl. No. 15/075,678, filed Mar. 21, 2016.
Final Office Action (dated Sep. 7, 2018) for U.S. Appl. No. 15/075,678, filed Mar. 21, 2016.
Kim et al., Service provider DevOps for large scale modern network services, May 11-15, 2015, IEEE, pp. 1391-1397. (Year: 2015).
Hicks et al., Dynamic Software Updating, 2000, ACM, pp. 1-11 (Year: 2000).
Ksplice, Wikipedia, Oct. 10, 2015, pp. 1-4. (Year: 2015).
Hot swapping, Wikipedia, Apr. 10, 2016, pp. 1-6. (Year: 2016).
Kpatch, Wikipedia, Sep. 8, 2015, pp. 1-3. (Year: 2015).
KGraft, Wikipedia, Sep. 6, 2015, pp. 1-3. (Year: 2015).
KerneiCare, Wikipedia, Mar. 19, 2014, pp. 1-2. (Year: 2014).
Sandbox (computer security), Wikipedia, Jan. 30, 2016, pp. 1-2. (Year: 2016).
Sandboxie, Wikipedia, Feb. 25, 2016, pp. 1-4. (Year: 2016).
Sandbox (software development), Wikipedia, Mar. 19, 2016, pp. 1-2. (Year: 2016).
Final Amendment (dated Nov. 5, 2018) for U.S. Appl. No. 15/075,678, filed Mar. 21, 2016.
Advisory Action (dated Nov. 29, 2018) for U.S. Appl. No. 15/075,678, filed Mar. 21, 2016.
RCE (Dec. 6, 2018) for U.S. Appl. No. 15/075,678, filed Mar. 21, 2016.
Notice of Allowance (dated Mar. 12, 2019) for U.S. Appl. No. 15/075,678, filed Mar. 21, 2016.
312 amendment (Mar. 14, 2019) for U.S. Appl. No. 15/075,678, filed Mar. 21, 2016.

* cited by examiner

REPLACING A VIRTUAL NETWORK FUNCTION IN A NETWORK SERVICE

This application is a continuation application claiming priority to Ser. No. 15/075,678, filed Mar. 21, 2016.

TECHNICAL FIELD

The present disclosure relates in general to data processing systems, and in particular, to concurrently replacing a virtual network function by a new version of the virtual network function without interruption of a network service.

BACKGROUND

Virtualization, as applied to computers and storage, is a very mature idea and is well along in technology maturing lifecycles. Benefits of virtualization include significantly lower costs, faster provisioning and a more efficient use of resources. A next logical step in virtualization is to incorporate all forms of networking including routing, switching, and security along with a breadth of protocols needed for enhanced network service delivery.

For service providers, business and operational support systems were designed and implemented with the basic premise that revenue bearing services are created, offered, deployed and terminated in a period of months dictating the foundation of most back office processes and systems. An emergence of virtualization, cloud computing, and use of virtualization and cloud computing, as a revenue-enabling activation platform in software defined network/network function virtualization (SDN/NFV) based production environments, may reduce service creation times significantly.

An operational support system infrastructure, including service assurance, may facilitate a high transaction volume of change.

When business targets are archived by implementing standard or proprietary solutions, operational aspects of virtualization may become significant. Therefore, requirements on dynamic deployment and runtime management of both virtual ized network elements and network services, based on a virtualized network infrastructure, may need to be introduced.

SUMMARY

Embodiments of the present invention provide a method and associated computer system and computer program product. A processor of a computer system queries a service catalog and a virtual service inventory to obtain network service instances including a virtual network function. The processor deploys a new version of the virtual network function by performing:
  (a) in response to a determination by the processor that one of the obtained network service instances is connected to a load balancer, the processor replaces a network address of the virtual network function in the load balancer with a network address of the new version of the virtual network function;
  (b) in response to a determination by the processor that the virtual network function is configured with an inherent load balancing, the processor updates load balancing tables of the virtual network function by replacing the network address of the virtual network function with the network address of the new version of the virtual network function;
  (c) in response to a determination by the processor that the virtual network function has a floating network address, the processor detaches the floating network address from the virtual network function and attaches the detached floating network address to the new version of the virtual network function;
  (d) in response to a determination by the processor that the virtual network function is part of a forwarding policy rule, the processor replaces the instance identifier of the virtual network function in the forwarding policy rule with the instance identifier of the new version of the virtual network function; or
  (e) combinations thereof.

BRIEF DESCRIPTION OF THE DRAWINGS

The present invention together with the above-mentioned and other objects and advantages may best be understood from the following detailed description of the embodiments, but not restricted to the embodiments.

DETAILED DESCRIPTION

Figure 1:
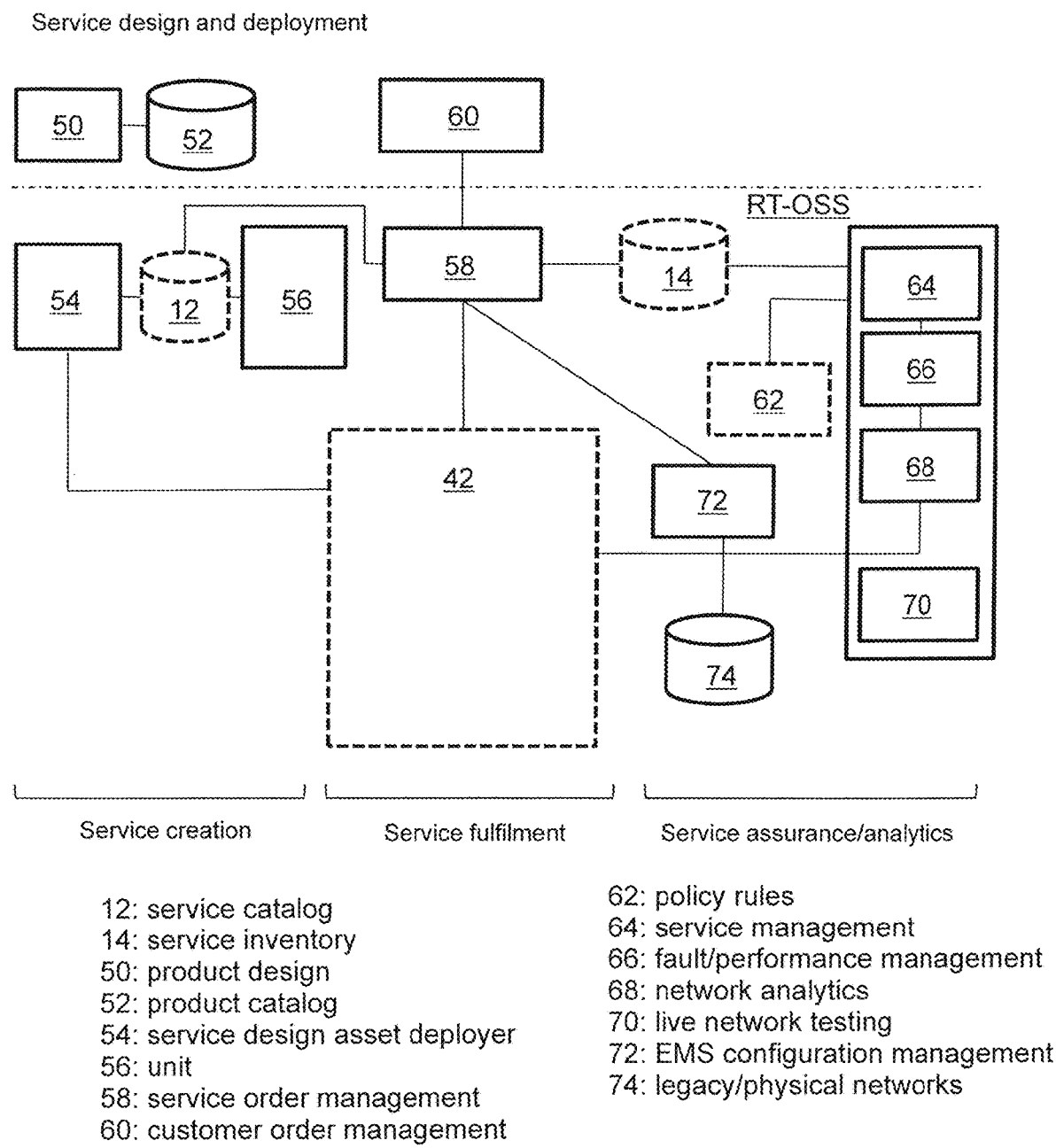
FIG. 1 depicts a reference architecture for replacing a virtualized network function by a new version of the virtualized network function without interruption of a network service, according to embodiments of the present invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method, system, and computer program product for replacing a virtual network function by a new version of the virtual network function. The illustrative embodiments are sometimes described herein using particular technologies only as an example for the clarity of the description. The illustrative embodiments may be used for replacing a virtual network function by a new version of the virtual network function without interruption of a network service.

According to requirements of a network function virtualization (NFV) Management and Orchestration (MANO), and the European Telecommunication Standards Institute (ETSI)-defined framework for the management and orchestration of virtualized network functions, a method according to embodiments of the present invention performs the replacement of the VNF according to the following ETSI MANO requirements.

Physical resources may be replaced by virtual resources in the service catalog 12 (FIG. 1).

Inventory system(s) may be modified: the virtual inventory (NFV Instances Repository) is added and propagated to a service inventory 14 (FIG. 1).

The MANO fulfilment process (NFVO: SO) may be extended to notify a real time operating support system (RT-OSS)/service assurance processes on Create/Update/Delete of a virtual instance/resource.

Service design and development may provide accurate asset generation and deployment.

FIG. 1 depicts a reference architecture for replacing a virtualized network function 10 by a new version 11 of the virtualized network function without interruption of the network service, according to embodiments of the present invention. Relevant components according to an embodiment of the invention are marked by dotted lines in FIG. 1. The network function 10 and/or the new version 11 are depicted in FIGS. 3-6. For service design and deployment, a product design 50 is stored in a product catalog 52. Customer order management 60 is communicating the orders of a customer to a service order management 58 of the RT-OSS. A service design asset deployer 54 is communicating with the service catalog 12, coupled to unit 56, implementing the functions of pre-deployment and Inter Operability Testing (IOT)/conformance. The service order management 58 updates the service inventory 14 with a service instance provisioned. The service order management 58 is communicating to the service inventory 14. The service inventory 14 is coupled to a service management 64, a fault/performance management 66, and a network analytics 68. A deployment of live network testing 70 is also implemented. Management of the whole process is performed by a network function virtualization orchestrator (NFVO) as an orchestration system 42, coupled to the service design asset deployer 54 as well as to the service order management 58 and the network analytics 68. An element management system (EMS)/configuration management 72 coupled with legacy/physical networks 74 is also communicating to the service order management 58. The service catalog 12, the service inventory 14 as well as policy rules 62 are changed and/or involved in the inventive method.

Figure 2:
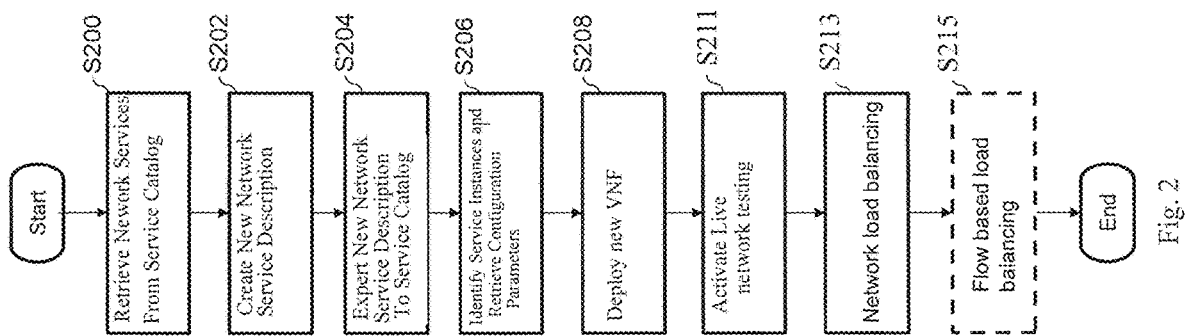
FIG. 2 is a flow chart of a generic process for replacing a virtualized network function by a new version of the virtualized network function, according to embodiments of the present invention.

FIG. 2 is a flow chart of a generic process for replacing a virtualized network function 10 by a new version 11 of the virtualized network function without interruption of the network service, according to an embodiments of the present invention. The replacement may serve to introduce new functionality or to provide bug fixes.

The VNF replacement process (replacement orchestrator) may be exposed by the NFVO 42 and may be started by an operations staff In one embodiment, replacing a virtual network function 10 by a new version of the virtual network function 11, without interruption of the network service includes: (i) querying a service catalog 12 and virtual service inventory 14 to obtain network service instances including the virtual network function 10; (ii) for each network service instance, obtaining metadata of the virtual network function and deriving a routing pattern from the metadata; (iii) deploying the new version of the virtual network function 11 by performing at least one step of the following steps: (a) in response to a determination that one of the obtained network service instances is connected to a load balancer, replacing a network address of the virtual network function 10 in the load balancer with a network address of the new version of the virtual network function 11; (b) in response to a determination that the virtual network function 10 is configured with an inherent load balancing, updating load balancing tables of the virtual network function 10 by replacing the network address of the virtual network function 10 with the network address of the new version of the virtual network function 11; (c) in response to a determination that the virtual network function 10 has a floating network address detaching the floating network address from the virtual network function 10 and attaching the detached floating network address to the new version of the virtual network function 11; or (d) in response to a determination that the virtual network function 10 is part of a forwarding policy rule, replacing the instance identifier of the virtual network function 10 in the forwarding policy rule with the instance identifier of the new version of the virtual network function 11.

In step S200, all network services are retrieved from the service catalog 12, where the VNF 10 is a building block. In step S202, the new network service (NS) description based on the new version of the VNF 11 is created from a NS descriptor. Next in step S204, new NS descriptors are exported into the NS and the service catalog 12, assuming that a physical network function (PNF) will not change. Then, in step S206 all affected service instances are identified and all configuration parameters are retrieved. In step S208, the new VNF version 11 is deployed as part of the network service instances including a virtual tester, and attached to the same PNF with a new route target. The new version of the virtual network function 11 may be prepared by deploying the new version of the virtual network function 11 as part of the network service instances and attaching the network service instances to the same physical network function. Next in step S211, the live network testing is activated and performed, followed by network load balancing in step S213. All new requests for a particular network service will be rerouted to a new service instance of the new version of the VNF 11, assuming that the orchestration system 42 has performed the mapping of the metadata. Optionally in step S215, a flow based load balancing may be carried out, where a SDN controller can redirect running traffic (e.g., a TCP session) to flow to the new service instance 11.

Performing service composition may be achieved by creating from a network service descriptor a new network service description based on the new version of the virtual network function 11. The service catalog 12 may be updated by exporting the new network service descriptors into the service catalog 12. Network load balancing may be performed by rerouting all new requests for a network service to the new network service instance of the new version of the virtual network function 11.

Advantages of the above-described embodiments of the method are summarized as follows. Each VNF 10 or VNF instance is deployed in different network services or different network service instances in a different environment. In a SDN/NFV enabled network, a replacement orchestrator workflow is designed to spin automatically and seamlessly a full configured instance of the VNF 11 using the metadata available and to replace the running VNF instance 10. The preceding replacement orchestrator workflow is enabled because automation can be implemented by extending the existing provisioning workflow with a pre-provisioning step (fetch environmental parameters) and a post provisioning step (test new VNF 11 and if successful, reroute traffic to new VNF 11).

Automatic mapping of metadata describing the deployment of the VNF 11 or entire network service and the network reconfiguration is performed (e.g., domain name service (DNS) IP@ update or update of external connections; e.g., enhanced node-B (eNB) rehoming, generation of the new test list emulating specific connectivity surroundings and network function).

For the testing of new VNF 11, a test list generator may use the metadata mapping results to generate and trigger network wide test scenarios for the new VNF 11.

During replacement orchestration propagation, there is a seamless switchover using the external and internal load balancer capabilities in combination with the SDN controller. The routing pattern can be controlled automatically if the metadata can be mapped.

During replacement orchestration propagation, there is a seamless switchover using the rerouting mechanism based on floating IP@ and traffic forwarding policies. There are specific control points to manage the seamless switchover via IP@ and traffic forwarding rules.

The inventive method exhibits a capability to provide a completely automated metadata-driven no-down-time replacement procedure. After the replacement is performed, the system can remove the old VNF instance 10, including the virtual networks.

There is an optional automated testing, in a sandbox environment and in a production network, integrated into the replacement process.

Before replacing the new VNF 11 in a sandbox environment and then replacing the new VNF 11 in a loop, all affected NS instances are running in the production environment by interrogating a network service inventory 14.

An automated fallback, triggered fully automatically or manually in case of replacement failures using the same mechanism and data in reversed direction, is provided. In case the replacing of the VNF 11 does not run in a stable manner, a fallback to the old VNF version 10, reusing the old routing, is initiated.

Figure 5:
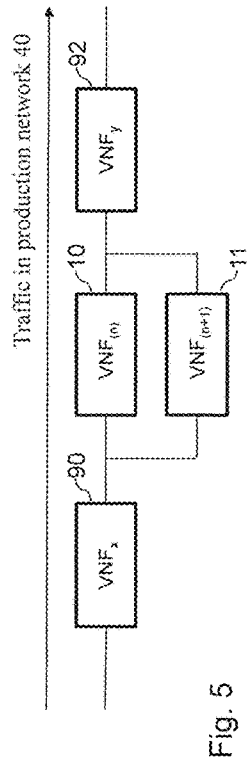
Figure 6:
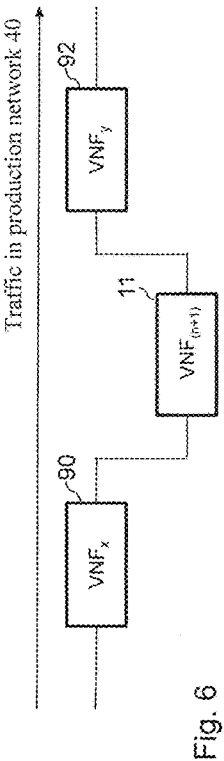
Figure 7:
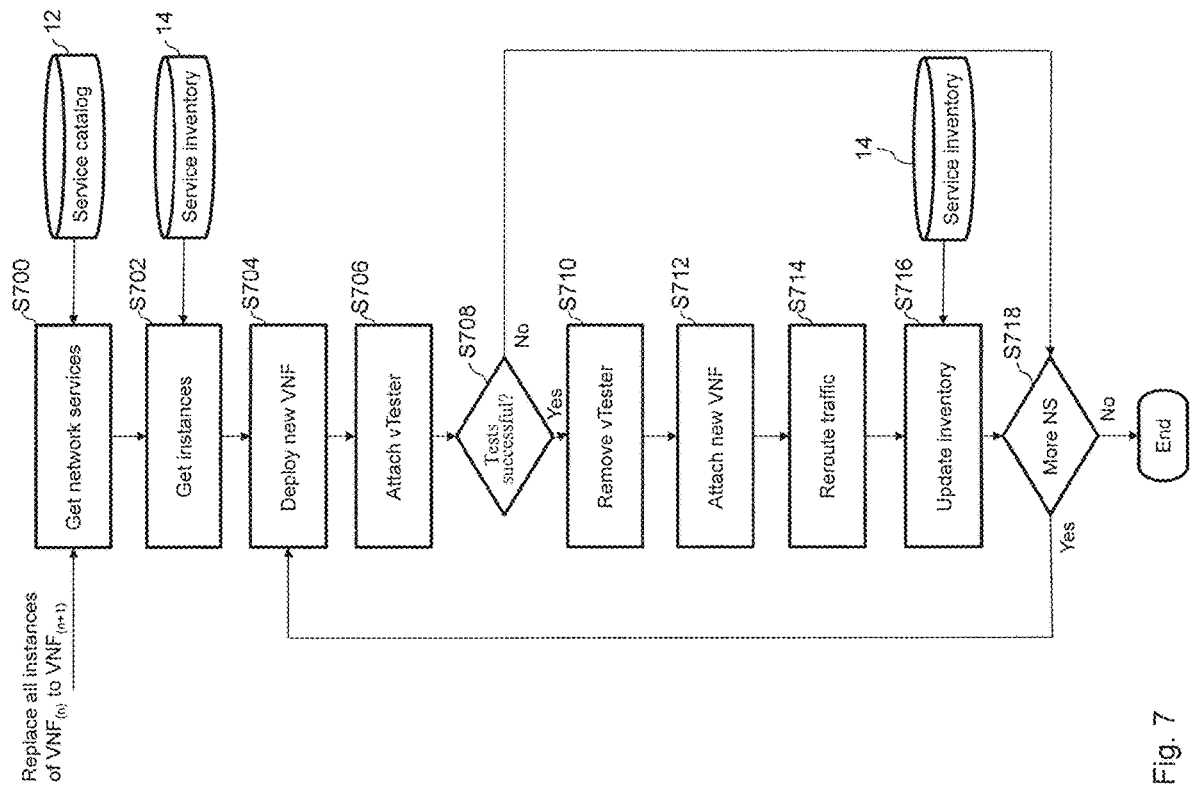
FIG. 7 is a flow chart of a process for replacing a virtualized network function by a new version, according to embodiments of the present invention.

FIGS. 3 to 6 depict in-service replacement of a virtualized network function by a new version of the virtualized network function without interruption of the network service, according to embodiments of the present invention, whereas the process of replacement is explained in the flow chart shown in FIG. 7.

Figure 3:
FIGS. 3 to 6 depict in-service replacement of a virtualized network function, according to embodiments of the present invention.
Figure 4:
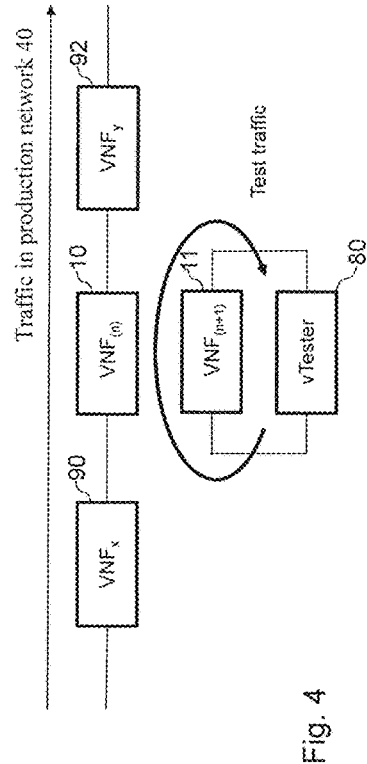

The virtual network function 10, in a production network 40, to be replaced is VNF(n) in FIG. 3. The virtual network function 11 that will replace VNF(n) is called VNF(n+1). At the end of the replacement process, all traffic that uses VNF(n) is routed to VNF(n+1) so that VNF(n) can be taken out of operation. The principle of in-service VNF replacement is introduced in four steps. In FIG. 3, an initial state with VNF(n) in production is shown. In FIG. 4, the VNF (n+1) and the test environment are deployed and tests are run using a virtual tester 80. In FIG. 5, the VNF(n+1) is attached to the production network 40. In FIG. 6, the test environment is removed and traffic is routed to VNF(n+1). Other VNFs 90, 92 in FIG. 3 are not disturbed by the replacement process.

The deployment metadata mapping may occur in a way that allows a seamless switching of traffic from VNF(n) to VNF(n+1). To implement the seamless switching of traffic, the replacement orchestrator inspects the network topology of VNF(n) to understand which routing pattern had initially been applied. This network topology of VNF(n) can be derived from the metadata of the network service; e.g., by looking at the connection points of VNF(n) and all direct neighbor VNFs. For the deployment of VNF(n+1), data from the network service inventory 14 are used; e.g., such data may include ID of the forwarding policy, floating IP ID, IP address of the load balancer, etc.

The routing pattern of the VNF(n) determines what will be performed. If VNF(n) has a direct link to a VNF of type load balancer, then the process may update the load balancer configuration by replacing the IP address of VNF(n) by VNF(n+1).

For load balancing, load balancing tables of the VNF may be updated by replacing the IP address of VNF(n) with the IP address of VNF(n+1), or by adding VNF(n+1), setting a relative capacity of VNF(n) to 0. If VNF(n) has a floating IP address attached, the replacement process may detach the floating IP address from VNF(n) and attach the detached floating IP address to VNF(n+1). If VNF(n) is part of a forwarding policy rule, the replacement process may modify this policy rule by replacing an instance id of VNF(n) with VNF(n+1).

To target all instances of a given VNF (all NS Services in place to which the VNF(n) contributes), the replacement orchestrator process may examine the catalogs 12 and service inventories 14 to gather information about all instances that are to be replaced.

FIG. 7 is a flow chart of a process for replacing a virtualized network function 10 by a new version, according to embodiments of the present invention.

The replacement process that is run by the NFVO 42 is depicted in FIG. 7. In step S700, the process is started by replacing all instances of VNF(n) with VNF(n+1). Therefore all network services that s VNF(n) are retrieved from the service catalog 12. Next in step S702, all necessary instances are retrieved from the network services and the VNF service inventory 14. In step S704, the new VNF(n+1) is deployed, followed by step S706 for attaching a virtual tester 80. Then tests are run in step S708. If the tests in step S708 are not successful, a check for more network services is carried out in step S718, returning to the step S704, if there are more network services. If step S718 determines that there are no more network services, the process is stopped. If the tests in step S708 are successful, the virtual tester 80 is removed in step S710, followed by step S712 which attaches the new VNF(n+1) to the production traffic. Then in step S714, the traffic is rerouted and in step S716 the network service VNF inventory 14 is updated, followed by the check for more network services in step S718, returning to the step S704 if step S718 determines that there are more network services. If step S718 determines that there are no more network services, the process is stopped.

Figure 8:
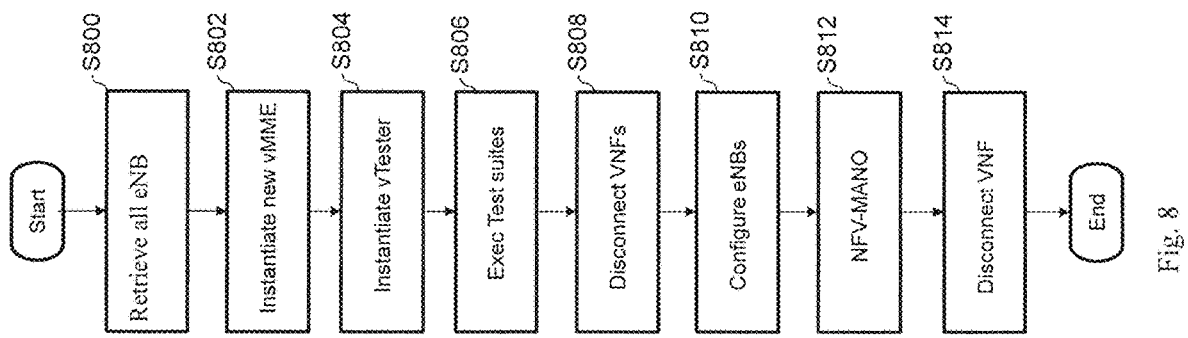
FIG. 8 a flowchart of a process for replacing a virtualized network function by a new version for a mobility management entity, according to further embodiments of the present invention.

FIG. 8 depicts a flowchart of a process for replacing a virtualized network function by a new version for a mobility management entity, according to further embodiments of the present invention.

The VNF in the further embodiment in FIG. 8 is a mobile management entity (vMME). The running vMME version is called vMME_old. The updated vMME version is called vMME_new. The vMME_old belongs to a MME group for load sharing and high availability. First in step S800, all enhanced node-B (eNB) connected to vMME_old are retrieved from a NFV Repository and Service Inventory. Next in step S802 the vMME_new is instantiated. The vMME_new is in an isolated network environment, which reflects the same virtualized network function forwarding graph (VNF-FG) and the connected VNFs as vMME_old. In step S804, the virtual tester is instantiated and the NFV-MANO configures the virtual tester as copies of the original connected VNFs and connected in the isolated VNF-FG, followed in step S806 by predefined test suites for functional and/or stress/load/regression tests being executed on the virtual tester to ensure functionality and performance of the vMME_new. Then after successful tests, the virtual tester emulated VNFs are disconnected step by step and the isolated VNF-FG is connected into the productive VNF-FG in step S808. Next in step S810, the eNBs are configured to connect to vMME_new as a new member of the MME group, which may happen either via NFV-MANO updating the DNS server and adding the vMME_new to the returned group of IP addresses for the MME DNS name or by automatic operations, administration, and maintenance (OAM) update of the eNBs via NFV-MANO. eNBs will establish a sctp connection to the vMME_new. In step S812, the NFV-MANO configures via OAM the vMME_old to set relative capacity to 0 to offload all subscribers. vMME_old signals all connected eNBs with a MME configuration update of the relative capacity to zero, vMME_old offloads all active user entities (UEs) with S1 release and causes "Load Balancing tracking area update (TAU) Required" (Load Rebalancing functionality). The UEs initiate a TAU and the eNB may connect the UE according to the relative capacity of the MMES in the MME group. Since the vMME_new is not yet loaded, most UEs will be connected. Optionally, the UEs are connected but idle UEs may be activated via paging. UEs, which are not disconnected after a timeout, may be detached from the network side. After all UEs are disconnected from vMME_old, the VNF can be disconnected in step S814. If the vMME_new shows problems in the operative network, there is an option to use the same load balancing mechanism to move all UEs from vMME_new back to vMME_old.

Figure 9:
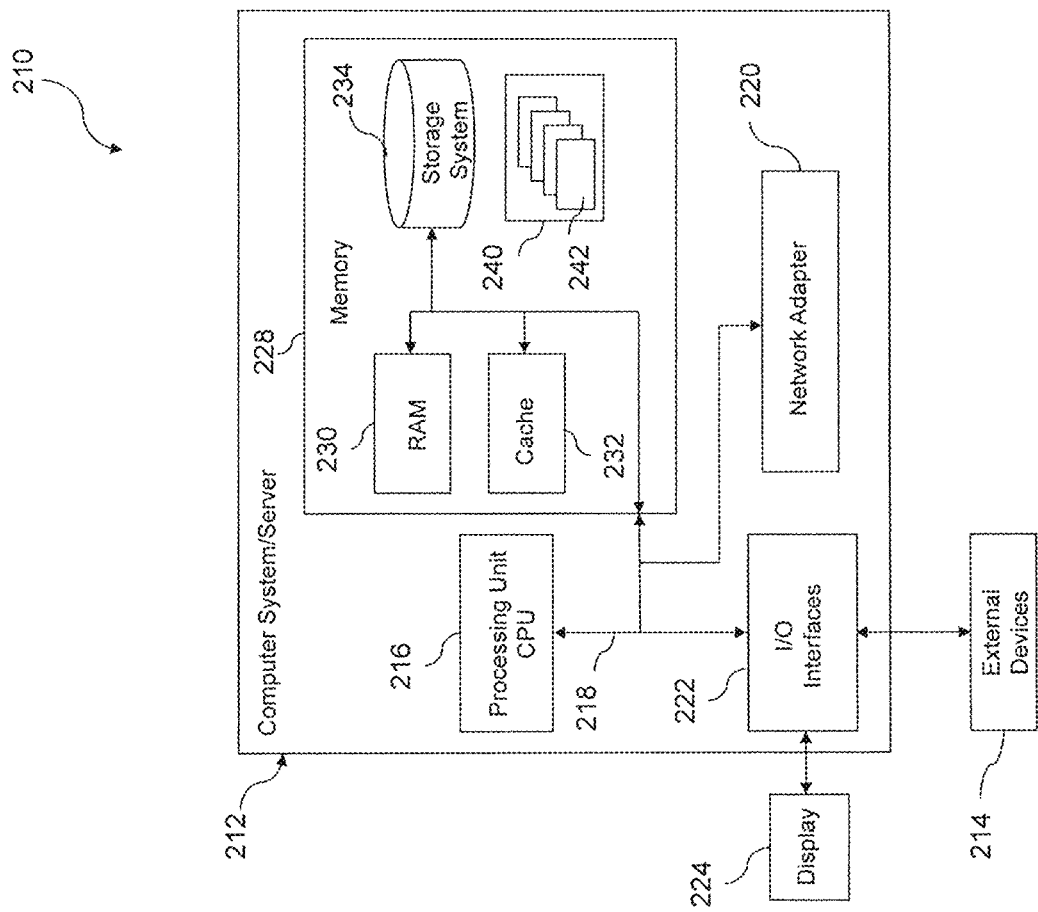
FIG. 9 depicts a data processing system according to embodiments of the present invention.

FIG. 9 depicts a data processing system 210 according to embodiments of the present invention. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode. Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said method comprising:

querying, by a processor of a computer system, a service catalog and a virtual service inventory to obtain network service instances of a network service that uses a virtual network function in a production environment of a production network within a data processing system architecture;

said processor seamlessly replacing the virtual network function by a new version of the virtual network function without interruption of the network service in the production environment of the production network within the data processing system architecture, said new version of the virtual network function improving a functionality of the production network within the data processing system architecture by introducing a new functionality applicable to the network service in the production environment of the production network and repairing an error in implementing the network service with the virtual network function in the production environment of the production network, without interruption of the network service in the production environment of the production network within the data processing system architecture, said seamlessly replacing the virtual network function with the new version of the virtual network function without interruption of the network service in the production environment of the production network comprising deploying the new version of the virtual network function unattached to the production environment of the production network;

said processor preparing the new version of the virtual network function by deploying the new version of the virtual network function as part of the network service instances and attaching the network service instances to a physical network function;

said processor initiating a tracking area update before deploying the new version of the virtual network function;

said deploying the new version of the virtual network function unattached to the production environment of the production network comprising:

in response to a determination by the processor that one of the obtained network service instances is connected to a load balancer, said processor replacing a network address of the virtual network function in the load balancer with a network address of the new version of the virtual network function;

in response to a determination by the processor that the virtual network function is configured with an inherent load balancing, said processor updating load balancing tables of the virtual network function by replacing the network address of the virtual network function with the network address of the new version of the virtual network function; and in response to a determination by the processor that the virtual network function has a floating network address, said processor detaching the floating network address from the virtual network function and attaching the detached floating network address to the new version of the virtual network function.

2. The method of claim 1, said seamlessly replacing the virtual network function with the new version of the virtual network function without interruption of the network service in the production environment of the production network comprising:

performing a test suite, using a virtual network tester, for the network service with the unattached new version of the virtual network function; and in response to successful completion of the test suite for the network service: attaching the new version of the virtual network function to the production environment of the production network, removing the virtual network tester, routing traffic to the new version of the virtual network function in the production environment of the production network, and updating the virtual service inventory with the service instances provisioned for the new virtual network function.

3. The method of claim 2, said updating the virtual service inventory comprising:

modifying the virtual service inventory for deploying the new version of the virtual network function by identifying the network service instances and retrieving all configuration parameters.

4. The method of claim 1, said method further comprising:

said processor performing service composition by creating, from a network service descriptor, a new network service description based on the new version of the virtual network function; and said processor updating the service catalog by exporting the new network service description into the service catalog without the physical network function being changed.

5. The method of claim 1, said deploying the new version of the virtual network function unattached to the production environment of the production network further comprising:

in response to a determination by the processor that the virtual network function is part of a forwarding policy rule, said processor replacing the instance identifier of the virtual network function in the forwarding policy rule with the instance identifier of the new version of the virtual network function.

6. The method of claim 1, wherein said replacing the virtual network function is performed by an orchestration system.

7. The method of claim 1, said method comprising:

said processor querying the service catalog and virtual service inventory by retrieving the network service instances, wherein the virtual network function is a building block.

8. The method of claim 1, said method comprising:
said processor preparing the new version of the virtual network function by deploying the new version of the virtual network, function as part of the network service instances and attaching the network service instances to a same physical network function.

9. The method of claim 1, said method comprising:
said processor performing a live network testing by the virtual network tester.

10. The method of claim 1, said method comprising:
said processor performing network load balancing by rerouting new requests for a network service to a new network service instance of the new version of the virtual network function.

11. The method of claim 10, said method comprising:
said processor performing a flow based load balancing by redirecting running traffic through a software defined network to the new network service instance.

12. A computer program product, comprising a computer readable hardware storage device having computer readable program code stored therein, said program code containing instructions executable by a processor of a computer system to implement a method, said method comprising:
said processor querying a service catalog and a virtual service inventory to obtain network service instances of a network service that uses a virtual network function in a production environment of a production network within a data processing system architecture;
said processor seamlessly replacing the virtual network function by a new version of the virtual network function without interruption of the network service in the production environment of the production network within the data processing system architecture, said new version of the virtual network function improving a functionality of the production network within the data processing system architecture by introducing a new functionality applicable to the network service in the production environment of the production network and repairing an error in implementing the network service with the virtual network function in the production environment of the production network, without interruption of the network service in the production environment of the production network within the data processing system architecture, said seamlessly replacing the virtual network function with the new version of the virtual network function without interruption of the network service in the production environment of the production network comprising deploying the new version of the virtual network function unattached to the production environment of the production network;
said processor preparing the new version of the virtual network function by deploying the new version of the virtual network function as part of the network service instances and attaching the network service instances to a physical network function;
said processor initiating a tracking area update before deploying the new version of the virtual network function;
said deploying the new version of the virtual network function unattached to the production environment of the production network comprising:
in response to a determination by the processor that one of the obtained network service instances is connected to a load balancer, said processor replacing a network address of the virtual network function in the load balancer with a network address of the new version of the virtual network function;
in response to a determination by the processor that the virtual network function is configured with an inherent load balancing, said processor updating load balancing tables of the virtual network function by replacing the network address of the virtual network function with the network address of the new version of the virtual network function; and
in response to a determination by the processor that the virtual network function has a floating network address, said processor detaching the floating network address from the virtual network function and attaching the detached floating network address to the new version of the virtual network function.

13. The computer program product of claim 12, said seamlessly replacing the virtual network function with the new version of the virtual network function without interruption of the network service in the production environment of the production network comprising:
performing a test suite, using a virtual network tester, for the network service with the unattached new version of the virtual network function; and
in response to successful completion of the test suite for the network service: attaching the new version of the virtual network function to the production environment of the production network, removing the virtual network tester, routing traffic to the new version of the virtual network function in the production environment of the production network, and updating the virtual service inventory with the service instances provisioned for the new virtual network function.

14. The computer program product of claim 13, said updating the virtual service inventory comprising:
modifying the virtual service inventory for deploying the new version of the virtual network function by identifying the network service instances and retrieving all configuration parameters.

15. The computer program product of claim 12, said method further comprising:
said processor performing service composition by creating, from a network service descriptor, a new network service description based on the new version of the virtual network function; and
said processor updating the service catalog by exporting the new network service description into the service catalog without the physical network function being changed.

16. A computer system, comprising a processor, a memory coupled to the processor, and a computer readable hardware storage device coupled to the processor, said storage device containing program code executable by the processor via the memory to implement a method, said method comprising:
said processor querying a service catalog and a virtual service inventory to obtain network service instances of a network service that uses a virtual network function in a production environment of a production network within a data processing system architecture;
said processor seamlessly replacing the virtual network function by a new version of the virtual network function without interruption of the network service in the production environment of the production network within the data processing system architecture, said new version of the virtual network function improving a functionality of the production network within the data processing system architecture by introducing a new functionality applicable to the network service in the production environment of the production network and repairing an error in implementing the network service with the virtual network function in the production environment of the production network, without interruption of the network service in the production environment of the production network within the data processing system architecture, said seamlessly replacing the virtual network function with the new version of the virtual network function without interruption of the network service in the production environment of the production network comprising deploying the new version of the virtual network function unattached to the production environment of the production network;

said processor preparing the new version of the virtual network function by deploying the new version of the virtual network function as part of the network service instances and attaching the network service instances to a physical network function;

said processor initiating a tracking area update before deploying the new version of the virtual network function;

said deploying the new version of the virtual network function unattached to the production environment of the production network comprising:
in response to a determination by the processor that one of the obtained network service instances is connected to a load balancer, said processor replacing a network address of the virtual network function in the load balancer with a network address of the new version of the virtual network function;
in response to a determination by the processor that the virtual network function is configured with an inherent load balancing, said processor updating load balancing tables of the virtual network function by replacing the network address of the virtual network function with the network address of the new version of the virtual network function; and
in response to a determination by the processor that the virtual network function has a floating network address, said processor detaching the floating network address from the virtual network function and attaching the detached floating network address to the new version of the virtual network function.

17. The computer system of claim 16, said seamlessly replacing the virtual network function with the new version of the virtual network function without interruption of the network service in the production environment of the production network comprising:
performing a test suite, using a virtual network tester, for the network service with the unattached new version of the virtual network function; and
in response to successful completion of the test suite for the network service: attaching the new version of the virtual network function to the production environment of the production network, removing the virtual network tester, routing traffic to the new version of the virtual network function in the production environment of the production network, and updating the virtual service inventory with the service instances provisioned for the new virtual network function.

18. The computer system of claim 17, said updating the virtual service inventory comprising:
modifying the virtual service inventory for deploying the new version of the virtual network function by identifying the network service instances and retrieving all configuration parameters.

19. The computer system of claim 16, said method further comprising:
said processor performing service composition by creating, from a network service descriptor, a new network service description based on the new version of the virtual network function; and
said processor updating the service catalog by exporting the new network service description into the service catalog without the physical network function being changed.

* * * * *